(12) United States Patent
Lee et al.

(10) Patent No.: US 12,265,684 B2
(45) Date of Patent: Apr. 1, 2025

(54) TOUCH PANEL AND TOUCH PANEL DISPLAY DEVICE INCLUDING THE SAME

(71) Applicant: LG Display Co., Ltd., Seoul (KR)

(72) Inventors: Mi-Rae Lee, Paju-si (KR); Min-Suk Kong, Paju-si (KR); Young-Jin Choe, Paju-si (KR); Young-Jun Jeon, Paju-si (KR)

(73) Assignee: LG Display Co., Ltd., Seoul (KR)

(*) Notice: Subject to any disclaimer, the term of this patent is extended or adjusted under 35 U.S.C. 154(b) by 199 days.

(21) Appl. No.: 17/943,968

(22) Filed: Sep. 13, 2022

(65) Prior Publication Data
US 2023/0168780 A1    Jun. 1, 2023

(30) Foreign Application Priority Data

Dec. 1, 2021    (KR) .................. 10-2021-0169837

(51) Int. Cl.
*G06F 3/044* (2006.01)
(52) U.S. Cl.
CPC .................. *G06F 3/0446* (2019.05)
(58) Field of Classification Search
CPC .................................................. G06F 3/0446
See application file for complete search history.

(56) References Cited

U.S. PATENT DOCUMENTS

| | | | |
|---|---|---|---|
| 10,475,862 B2 | 11/2019 | Jeong et al. | |
| 11,037,996 B2 | 6/2021 | Jeong et al. | |
| 2016/0147339 A1* | 5/2016 | Teranishi | G06F 3/0412 345/174 |
| 2018/0358413 A1* | 12/2018 | Lee | G06F 3/04164 |
| 2019/0051708 A1 | 2/2019 | Jeong et al. | |
| 2020/0052044 A1 | 2/2020 | Jeong et al. | |

FOREIGN PATENT DOCUMENTS

KR    10-2019-0018591 A    2/2019

* cited by examiner

*Primary Examiner* — Matthew Salvucci
(74) *Attorney, Agent, or Firm* — Fenwick & West LLP

(57) ABSTRACT

A touch panel includes: a substrate including a central area and a boundary area; a plurality of touch transmitting electrodes on the substrate; and a plurality of touch receiving electrodes that cross the plurality of touch transmitting electrodes to define a plurality of touch units, wherein one of the plurality of touch transmitting electrodes in the boundary area includes at least one transmitting main electrode, at least one transmitting auxiliary electrode that is parallel to and separated from the at least one transmitting main electrode, and at least one auxiliary connecting electrode that connects together the at least one transmitting main electrode and the at least one transmitting auxiliary electrode, and wherein one of the plurality of touch transmitting electrodes in the central area includes at least one transmitting main electrode but not any transmitting auxiliary electrode and auxiliary connecting electrode.

21 Claims, 10 Drawing Sheets

FIG. 10

| classification | comparison example | third embodiment | sixth embodiment |
|---|---|---|---|
| Cm[pF] | 0.2302 | 0.30106 | 0.31011 |
| ΔCm[pF] | 0.02629 | 0.03257 | 0.03716 |
| sensitivity[%] | 11.42 | 10.82 | 11.98 |
| Cpen(Rx/Tx)[Ff] | 3.54/2.21 | 3.47/2.63 | 3.47/2.62 |

TOUCH PANEL AND TOUCH PANEL DISPLAY DEVICE INCLUDING THE SAME

CROSS-REFERENCE TO RELATED APPLICATION

The present application claims the priority benefit of Republic of Korea Patent Application No. 10-2021-0169837 filed on Dec. 1, 2021, which is hereby incorporated by reference in its entirety.

BACKGROUND

Field of the Disclosure

The present disclosure relates to a touch panel, and more particularly, to a touch panel and a touch display device including the touch panel where a mutual capacitance deviation increases and a touch sensitivity is improved by forming a touch transmitting electrode of a boundary area as a transmitting main electrode and a transmitting auxiliary electrode parallel to each other.

Description of the Background

According to an information-oriented society, a display device field has been rapidly progressed. A liquid crystal display (LCD) device, an organic light emitting diode (OLED) display device and a field emission display (FED) device have been developed as a flat panel display (FPD) device having a thin profile, a light weight and a low power consumption.

In the touch display device, an additional touch panel may be attached to a display panel, or a touch panel may be formed on a substrate of a display panel to be integrated in the display panel.

In an add on touch (AOT) type where an additional touch panel is attached to a display panel, an area of a touch unit that is a minimum unit of a touch sensing is designed asymmetric in a central area and a boundary area to overcome a design limit of the boundary area with respect to the central area.

However, when the area of the touch unit of the boundary area is formed smaller than the area of the touch unit of the central area, the touch sensitivity of the boundary area is reduced with respect to the touch sensitivity of the central area.

SUMMARY

Accordingly, the present disclosure is directed to a touch panel and a touch display device including the touch panel that substantially obviate one or more of the problems due to limitations and disadvantages of the related art.

Also, the present disclosure is to provide a touch panel and a touch display device including the touch panel where a design limit of a boundary area is overcome, a mutual capacitance deviation increases and a touch sensitivity is improved by forming a transmitting main electrode and a transmitting auxiliary electrode parallel to each other as a touch transmitting electrode in a touch unit of the boundary area having a relatively small area.

In addition, the present disclosure is to provide a touch panel and a touch display device including the touch panel where a design limit of a boundary area is overcome, a mutual capacitance deviation further increases and a touch sensitivity is further improved by forming a transmitting main electrode and a transmitting auxiliary electrode alternately disposed at both sides of the transmitting main electrode as a touch transmitting electrode in a touch unit of the boundary area having a relatively small area.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a touch panel includes: a substrate including a central area and a boundary area; a plurality of touch transmitting electrodes on the substrate; and a plurality of touch receiving electrodes that cross the plurality of touch transmitting electrodes to define a plurality of touch units, wherein one of the plurality of touch transmitting electrodes in the boundary area includes at least one transmitting main electrode, at least one transmitting auxiliary electrode that is parallel to and separated from the at least one transmitting main electrode, and at least one auxiliary connecting electrode that connects together the at least one transmitting main electrode and the at least one transmitting auxiliary electrode, and wherein one of the plurality of touch transmitting electrodes in the central area includes at least one transmitting main electrode but not any transmitting auxiliary electrode and auxiliary connecting electrode.

In another aspect, a touch display device includes: a display panel configured to display an image; a touch panel on the display panel, the touch panel including: a substrate including a central area and a boundary area; a plurality of touch transmitting electrodes on the substrate; and a plurality of touch receiving electrodes that cross the plurality of touch transmitting electrodes to define a plurality of touch units, wherein one of the plurality of touch transmitting electrodes in the boundary area includes at least one transmitting main electrode, at least one transmitting auxiliary electrode that is parallel to and separated from the at least one transmitting main electrode, and at least one auxiliary connecting electrode that connects together the at least one transmitting main electrode and the at least one transmitting auxiliary electrode, and wherein one of the plurality of touch transmitting electrodes in the central area includes at least one transmitting main electrode but not any auxiliary electrode and auxiliary connecting electrode; and a cover window on the touch panel.

In another aspect, a touch panel comprises: a substrate including a central area and a boundary area that is at least partially around the central area; a plurality of first touch electrodes across the central area and the boundary area, the plurality of first touch electrodes configured to transmit a touch receiving signal indicative of touch of the touch panel; a first touch unit in the central area, the first touch unit having a first area and including one or more one second touch electrodes that cross the plurality of first touch electrodes in the central area, the one or more second touch electrodes configured receive a touch transmitting signal for sensing the touch; and a second touch unit in the boundary area, the second touch unit having a second area that is less than the first area and including one or more one second touch electrodes that cross the plurality of first touch electrodes in the boundary area, the one or more second touch electrodes configured receive the touch transmitting signal for sensing the touch, wherein a total number of the one or more second touch electrodes in the second touch unit in the boundary area is greater than a total number of the one or more second touch electrodes in the first touch unit in the central area.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate aspects of the disclosure and together with the description serve to explain the principles of the disclosure.

In the drawings:

FIG. 10 is a table showing a mutual capacitance, a change of a mutual capacitance, a touch sensitivity and a parasitic capacitance of a touch display device according to third and sixth embodiments of the present disclosure.

DETAILED DESCRIPTION

Figure 1:
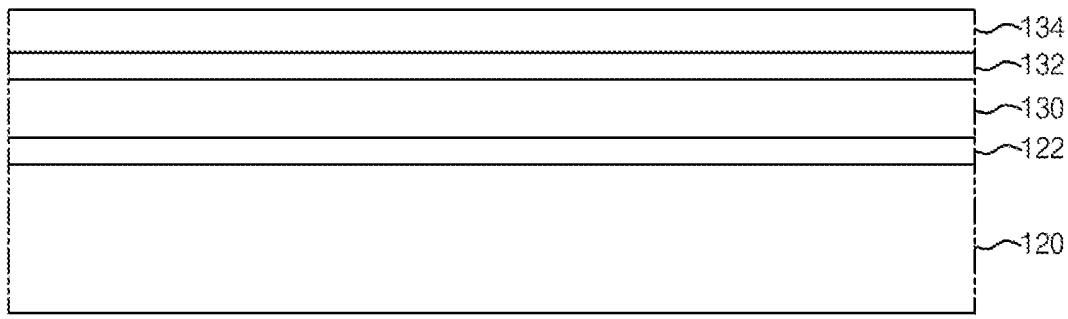
FIG. 1 is a cross-sectional view showing a touch display device according to a first embodiment of the present disclosure.

Reference will now be made in detail to aspects of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following example aspects described with reference to the accompanying drawings. The present disclosure may, however, be embodied in different forms and should not be construed as limited to the example aspects set forth herein. Rather, these example aspects are provided so that this disclosure may be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing aspects of the present disclosure are merely an example. Thus, the present disclosure is not limited to the illustrated details. Like reference numerals refer to like elements throughout. In the following description, when the detailed description of the relevant known function or configuration is determined to unnecessarily obscure an important point of the present disclosure, the detailed description of such known function or configuration may be omitted. In a case where terms "comprise," "have," and "include" described in the present specification are used, another part may be added unless a more limiting term, such as "only," is used. The terms of a singular form may include plural forms unless referred to the contrary.

In construing an element, the element is construed as including an error or tolerance range even where no explicit description of such an error or tolerance range. In describing a position relationship, when a position relation between two parts is described as, for example, "on," "over," "under," or "next," one or more other parts may be disposed between the two parts unless a more limiting term, such as "just" or "direct(ly)," is used.

In describing a time relationship, when the temporal order is described as, for example, "after," "subsequent," "next," or "before," a case which is not continuous may be included unless a more limiting term, such as "just," "immediate(ly)," or "direct(ly)," is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms like "first," "second," "A," "B," "(a)," and "(b)" may be used. These terms are merely for differentiating one element from another element, and the essence, sequence, order, or number of a corresponding element should not be limited by the terms. Also, when an element or layer is described as being "connected," "coupled," or "adhered" to another element or layer, the element or layer can not only be directly connected or adhered to that other element or layer, but also be indirectly connected or adhered to the other element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of aspects, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and aspects of the present disclosure are not limited thereto.

Features of various aspects of the present disclosure may be partially or overall coupled to or combined with each other, and may be variously inter-operated with each other and driven technically as those skilled in the art can sufficiently understand. Aspects of the present disclosure may be carried out independently from each other, or may be carried out together in co-dependent relationship.

Reference will now be made in detail to the present disclosure, examples of which are illustrated in the accompanying drawings.

FIG. 1 is a cross-sectional view showing a touch display device according to a first embodiment of the present disclosure. The touch display device according to a first embodiment of the present disclosure exemplarily includes an add on touch type in which the touch panel is added to a separate display panel.

In FIG. 1, a touch display device 110 according to a first embodiment of the present disclosure includes a display panel 120, a first adhesive layer 122, a touch panel 130, a second adhesive layer 132 and a cover window 134.

The display panel 120 displays an image by using a plurality of red, green and blue subpixels (not shown) and may be an organic light emitting diode (OLED) display device or a liquid crystal display (LCD) device.

The first adhesive layer 122 attaches the touch panel 130 to the display panel 120 and may include an optically clear adhesive (OCA) or an optically clear resin (OCR).

Figure 2:
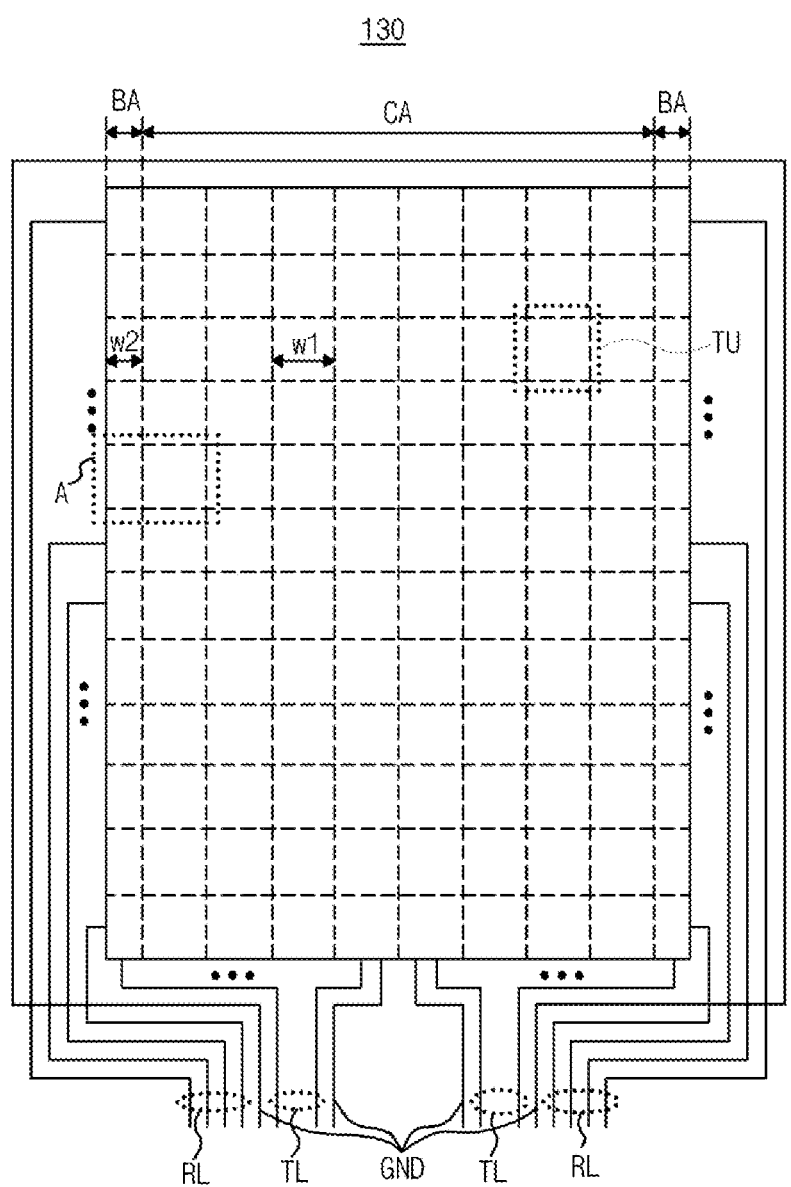
FIG. 2 is a plan view showing a touch panel of a touch display device according to the first embodiment of the present disclosure.

The touch panel 130 detects a touch using a plurality of touch units TU of FIG. 2 and may have a mutual capacitance type sensing where a change of a mutual capacitance Cm (of FIG. 10) between a touch transmitting electrode Tx (of FIG. 3) and a touch receiving electrode Rx (of FIG. 3) according to a touch is detected.

The second adhesive layer 132 attaches the cover window 134 to the touch panel 130 and may include an optically clear adhesive (OCA) or an optically clear resin (OCR).

Figure 3:
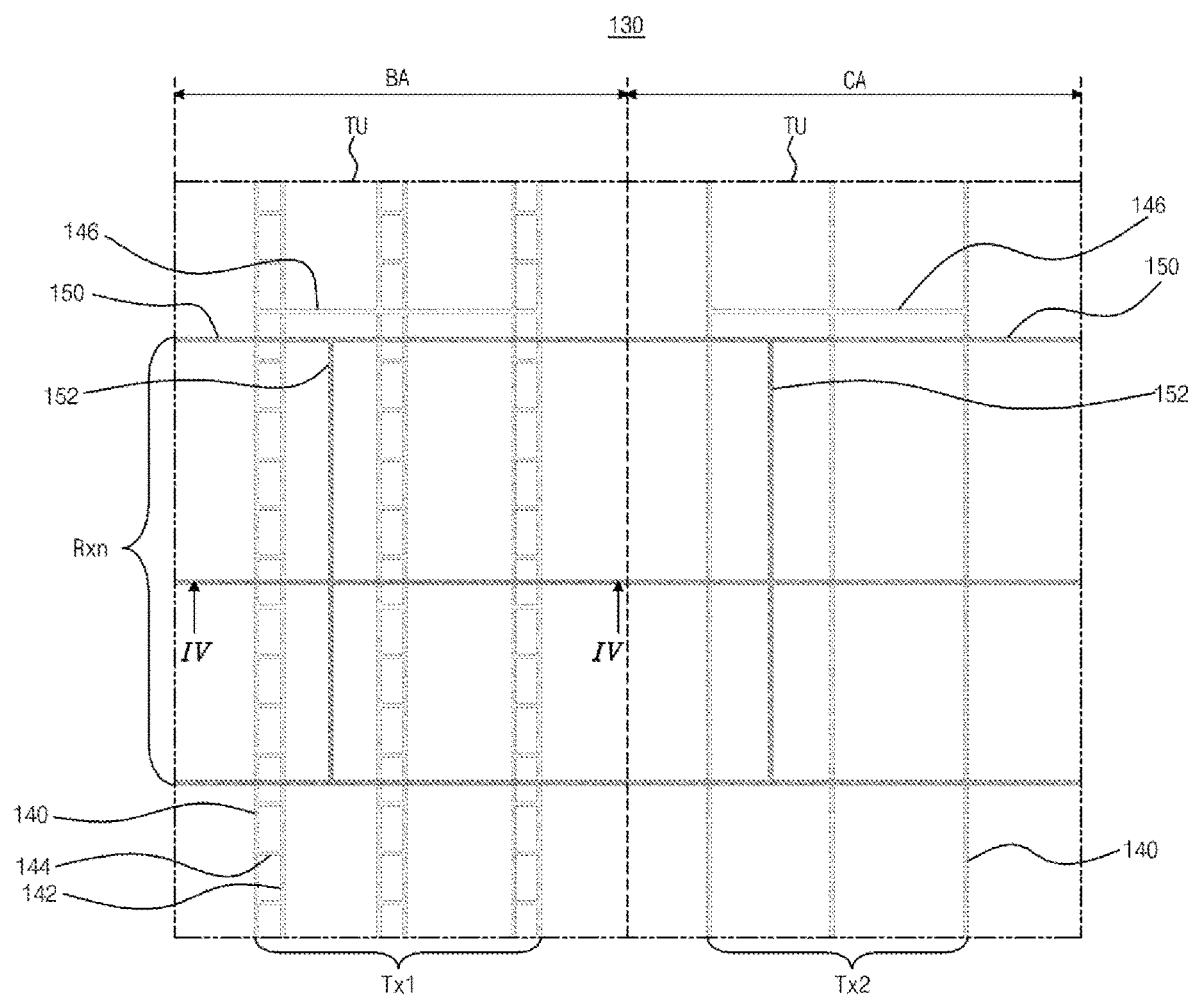
FIG. 3 is a magnified view showing a portion A of FIG. 2 according to the first embodiment of the present disclosure.
Figure 4:
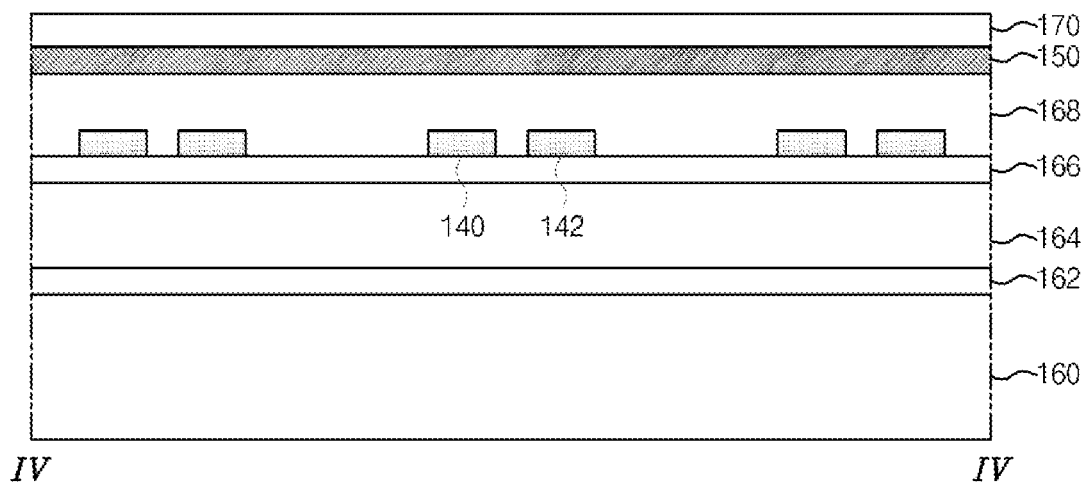
FIG. 4 is a cross-sectional view taken along a line IV-IV of FIG. 3 according to the first embodiment of the present disclosure.

FIG. 2 is a plan view showing a touch panel of a touch display device according to the first embodiment of the present disclosure, FIG. 3 is a magnified view showing a portion A of FIG. 2 according to the first embodiment of the present disclosure, and FIG. 4 is a cross-sectional view taken along a line IV-IV of FIG. 3 according to the first embodiment of the present disclosure. Although FIG. 3 illustrates a width of the touch unit TU in the boundary area BA to be similar to a width of the touch unit TU in the central area CA, the drawings are not to scale and show similar widths for ease of illustration.

In FIGS. 2 and 3, the touch panel 130 of the touch display device 110 according to a first embodiment of the present disclosure includes a plurality of touch transmitting electrodes Tx1 to Txp and a plurality of touch receiving electrodes Rx1 to Rxq. The plurality of touch transmitting electrodes Tx1 to Txp and the plurality of touch receiving electrodes Rx1 to Rxq cross each other to define a plurality of touch units TU.

For example, the plurality of touch transmitting electrodes Tx1 to Txp may be disposed along a vertical direction parallel to a long side of a rectangular shape of the touch panel 130, and the plurality of touch receiving electrodes Rx1 to Rxq may be disposed along a horizontal direction parallel to a short side of the rectangular shape of the touch panel 130.

The plurality of touch transmitting electrodes Tx1 to Txp receive a touch transmitting signal (e.g., a touch driving signal) for sensing touch through a plurality of touch transmitting lines TL from a touch driving unit (not shown), and the plurality of touch receiving electrodes Rx1 to Rxq transmit a touch receiving signal indicative of touch of the touch panel 130 through a plurality of touch receiving lines RL to the touch driving unit.

The touch panel 130 receives a ground signal through a ground line GND from the touch driving unit.

The touch panel 130 has a central area CA and a boundary area BA at both sides of the central area CA. A first width w1 of touch unit TU in the central area CA along the short side of the rectangular shape is greater than a second width w2 of a touch unit TU in the boundary area BA along the short side of the rectangular shape, and an area of the touch unit TU in the central area CA is greater than an area of the touch unit TU in the boundary area BA.

For example, the second width w2 may be within a range of about 50% to about 60% (about 55% to about 57%) of the first width w1 in one embodiment.

As a result, a design limit of the boundary area BA with respect to the central area CA may be overcome.

Among the plurality of touch transmitting electrodes Tx1 to Txp, a touch transmitting electrode Tx of the touch unit TU in the boundary area BA includes a transmitting main electrode 140 and a transmitting auxiliary electrode 142, and the touch transmitting electrode Tx of the touch unit TU in the central area CA includes the touch main electrode 140. As a result, a reduction of a touch sensitivity in the boundary area BA may be reduced compared to the central area CA.

For example, a first touch transmitting electrode Tx1 in the boundary area BA among the plurality of touch transmitting electrodes Tx1 to Txp includes a transmitting main electrode 140 parallel to a vertical direction which is a direction of the long side of the rectangular shape, a transmitting auxiliary electrode 142 parallel to and separated from the transmitting main electrode 140 and an auxiliary connecting electrode 144 connecting the transmitting main electrode 140 and the transmitting auxiliary electrode 142.

The transmitting main electrode 140 of the boundary area BA has a straight bar shape extending along the vertical direction across a whole of each touch unit TU, and the transmitting main electrodes 140 of the boundary area BA of the adjacent touch units TU are connected to each other. As a result, the transmitting main electrode 140 of the boundary area BA may have a straight bar shape extending and connected across the entire touch panel 130.

The transmitting auxiliary electrode 142 of the boundary area BA has a straight bar shape extending along the vertical direction across a whole of each touch unit TU, and the transmitting auxiliary electrodes 142 of the adjacent touch units TU may have a straight bar shape extending and connected across a whole of the touch panel 130.

The auxiliary connecting electrode 144 may have a straight bar shape. But the present disclosure is not limited thereto. For example, the auxiliary connecting electrode 144 may have any shape, such as curved bar shape or diagonal straight bar shape, as long as it connects together the transmitting main electrode 140 and the transmitting auxiliary electrode 142. In addition, a number of auxiliary connecting electrodes 144 per touch unit TU could be one or more. In addition, a width of the auxiliary connecting electrodes 144 could be less than, equal to or greater than that of the transmitting connecting electrode 146.

Although the first touch transmitting electrode Tx1 in the boundary area BA at a left side (e.g., a first side) of the central area CA includes the transmitting main electrode 140, the transmitting auxiliary electrode 142 and the auxiliary connecting electrode 144 in FIG. 3, a pth touch transmitting electrode Txp in the boundary area BA at a right side (e.g., a second side) of the central area CA may also include the transmitting main electrode 140, the transmitting auxiliary electrode 142, and the auxiliary connecting electrode 144.

A second touch transmitting electrode Tx2 in the central area CA among the plurality of touch transmitting electrodes Tx1 to Txp includes the transmitting main electrode 140 parallel to the vertical direction which is a direction of the long side of the rectangular shape. That is, the second touch transmitting electrode Tx2 in the central area CA lacks the transmitting auxiliary electrode 142 and the auxiliary connecting electrode 144.

The transmitting main electrode 140 of the central area CA has a straight bar shape extending along the vertical direction across a whole of each touch unit TU, and the transmitting main electrodes 140 of the central area CA of the adjacent touch units TU are connected to each other via a transmitting connecting electrode 146 in the central area CA. As a result, the transmitting main electrode 140 of the central area CA may have a straight bar shape extending and connected across a whole of the touch panel 130.

Although the second touch transmitting electrode Tx2 in the central area CA includes the transmitting main electrode 140 in FIG. 3, each of third to (p−1)th touch transmitting electrodes Tx3 to Tx (p−1) in the central area CA may also include the transmitting main electrode 140.

In the touch unit TU of the boundary area BA and the central area CA, the transmitting main electrode 140 may have a number of one or more per one touch unit TU. When the transmitting main electrode 140 has a number of two or more, the two or more transmitting main electrodes 140 parallel to and separated from each other may be connected to each other through the transmitting connecting electrode 146.

The transmitting connecting electrode 146 may have a straight bar shape.

An nth touch receiving electrode Rxn of the plurality of touch receiving electrodes Rx1 to Rxq includes a receiving main electrode 150 parallel to a horizontal direction which is a direction of a short side of the rectangular shape.

The receiving main electrode 150 has a straight bar shape extending along the horizontal direction across a whole of each touch unit TU, and the receiving main electrodes 150 of the adjacent touch units TU are connected to each other via the receiving connecting electrode 152. As a result, the receiving main electrode 150 may have a straight bar shape extending and connected across a whole of the touch panel 130.

Although the nth touch receiving electrode Rxn includes the receiving main electrode 150 in FIG. 3, each of first to (n−1)th touch receiving electrodes Rx1 to Rx(n−1) and (n+1)th to qth touch receiving electrodes Rx(n+1) to Rxq may also include the receiving main electrode 150.

The receiving main electrode 150 may have a number of one or more per one touch unit TU. When the receiving main electrode 150 has a number of two or more, the two or more receiving main electrodes 150 parallel to and separated from each other may be connected to each other through the receiving connecting electrode 152.

The receiving connecting electrode 152 may have a straight bar shape.

Although not shown, the transmitting main electrode 140, the transmitting auxiliary electrode 142, the auxiliary connecting electrode 144 and the transmitting connecting electrode 146 of the touch transmitting electrode Tx and the receiving main electrode 150 and the receiving connecting electrode 152 of the touch receiving electrode Rx may be disposed to correspond to a border portion between subpixels of the display panel 120.

Although the boundary area BA is disposed along the long side of the rectangular shape of the touch panel 130 in FIG. 2, the boundary area BA may be disposed along the short side of the rectangular shape of the touch panel 130 and the touch receiving electrode Tx of the boundary area BA may include the receiving main electrode 140, the receiving auxiliary electrode 142 and the receiving connecting electrode 144 in another embodiment.

In FIG. 4, the touch panel 130 includes a substrate 160, a sacrificing layer 162, a first insulating layer 164 and a barrier layer 166 sequentially on the substrate 160, the transmitting main electrode 140 and the transmitting auxiliary electrode 142 of the touch transmitting electrode Tx on the barrier layer 166, a second insulating layer 168 on the touch transmitting electrode Tx, the receiving main electrode 150 of the touch receiving electrode Rx on the second insulating layer 168 and a passivation layer 170 on the touch receiving electrode Rx.

The substrate 160 may include a glass, and the sacrificing layer 162 may include an inorganic insulating material such as silicon nitride (SiNx). The first and second insulating layers 164 and 168 may include an organic insulating material such as photoacryl (PAC), and the barrier layer 166 and the passivation layer 170 may include an inorganic insulating material such as silicon oxide ($SiO_2$) and silicon nitride (SiNx).

The touch transmitting electrode Tx and the touch receiving electrode Rx may include a metallic material such as aluminum (Al), molybdenum (Mo), chromium (Cr), titanium (Ti), nickel (Ni), neodymium (Nd) and copper (Cu) or a transparent conductive material such as indium tin oxide (ITO) and indium zinc oxide (IZO).

The touch panel 130 is attached to the display panel 120 through the first adhesive layer 122 such that the passivation layer 170 faces into the display panel 120. Next, the substrate 160 is divided from the first insulating layer 164 by removing the sacrificing layer 162 using a laser irradiation or an etchant. Next, the cover window 143 is attached to the exposed first insulating layer 164 through the second adhesive layer 132, thereby the touch display device 110 is completed.

In another embodiment, the sacrificing layer 162 is omitted, and the touch panel 130 may be attached to the display panel 120 through the first adhesive layer 122 such that the substrate 160 faces into the display panel 120.

In the touch display device 110 according to a first embodiment of the present disclosure, since the touch unit TU of the boundary area BA of the touch panel 130 is formed to have an area that is smaller than an area of the touch unit TU of the central area CA, a design limit of the boundary area BA with respect to the central area CA is overcome due to the touch unit in the boundary area BA having a total number of touch transmitting electrodes (e.g., a transmitting main electrode, a transmitting auxiliary electrode, and an auxiliary connecting electrode) that is greater than a total number of touch transmitting electrodes (e.g., a transmitting main electrode) of a touch unit TU in the central area CA.

Further, a touch is detected from a change ΔCm of a mutual capacitance Cm between the touch transmitting electrode Tx and the touch receiving electrode Rx according to a touch of a finger, and the touch transmitting electrode Tx of the boundary area BA includes the transmitting main electrode 140 having a straight bar shape extending and connected across a whole of the touch unit TU and the transmitting auxiliary electrode 142 having a straight bar shape extending and connected across a whole of the touch unit TU. As a result, an area of the touch electrode corresponding to a finger substantially increases due to the increased number of touch electrodes in the touch unit TU in the boundary area BA and the change ΔCm of the mutual capacitance Cm increases, thereby a touch sensitivity is improved.

In another embodiment, the transmitting auxiliary electrode may be formed to have a divided shape.

Figure 5:
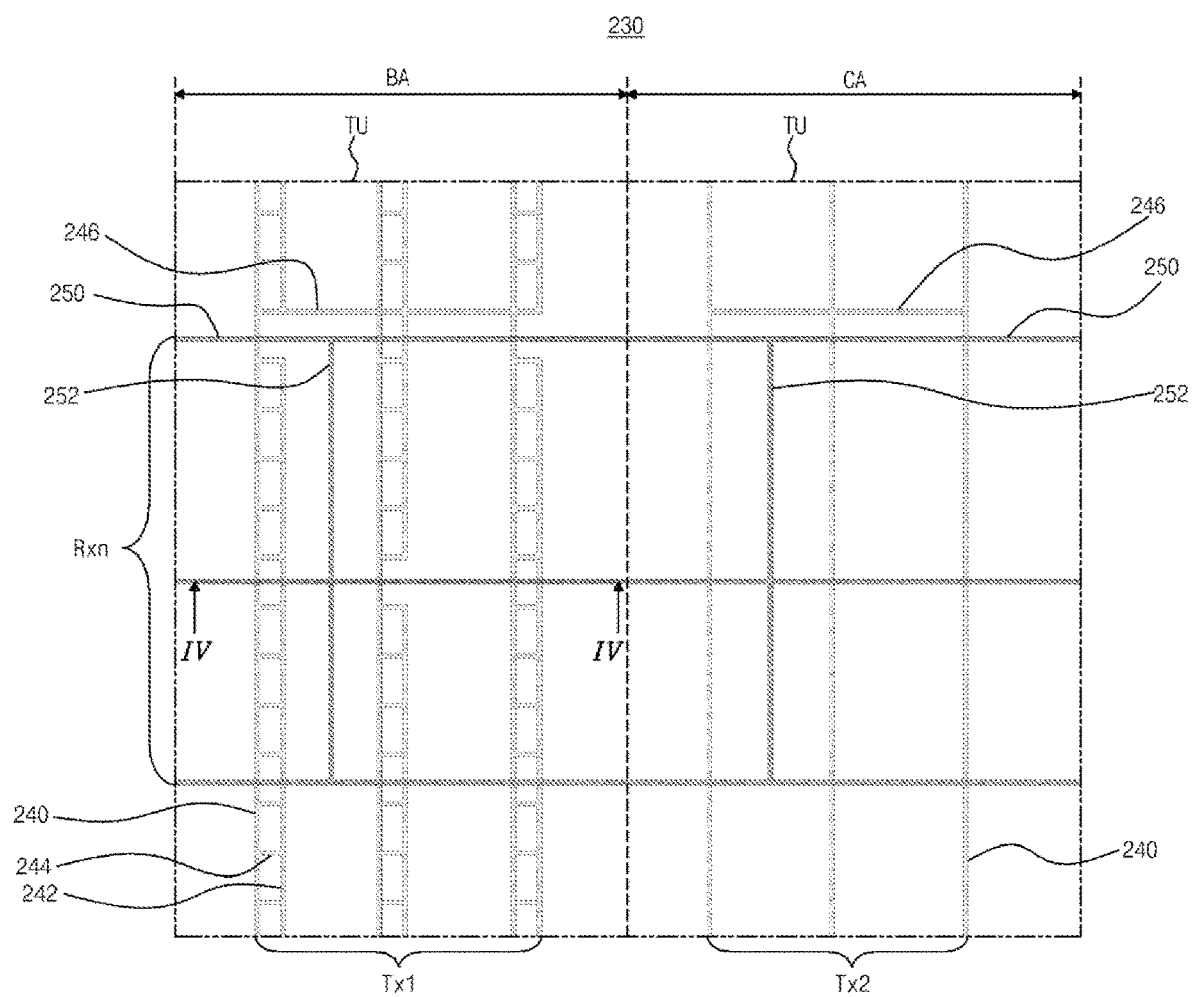
FIG. 5 is a plan view showing a touch panel of a touch display device according to a second embodiment of the present disclosure.

FIG. 5 is a plan view showing a touch panel of a touch display device according to a second embodiment of the present disclosure. Description of a part of the second embodiment that is the same as a part of the first embodiment is omitted for ease of description. Although FIG. 5 illustrates a width of the touch unit TU in the boundary area BA to be similar to a width of the touch unit TU in the central area CA, the drawings are not to scale and show similar widths for ease of illustration.

In FIG. 5, a touch panel 230 of a touch display device according to a second embodiment of the present disclosure has a central area CA and a boundary area BA at both sides of the central area CA. Among a plurality of touch transmitting electrodes Tx1 to Txp, a touch transmitting electrode Tx of a touch unit TU of the boundary area BA includes a transmitting main electrode 240 and a transmitting auxiliary electrode 242, and the touch transmitting electrode Tx of the touch unit TU of the central area CA includes the transmitting main electrode 240 without a transmitting auxiliary electrode 242 and an auxiliary connecting electrode 244. As a result, a reduction of a touch sensitivity in the boundary area BA may be reduced as compared with the central area CA.

For example, a first touch transmitting electrode Tx1 in the boundary area BA among the plurality of touch transmitting electrodes Tx1 to Txp includes a transmitting main electrode 240 parallel to a vertical direction which is a direction of a long side of a rectangular shape, a transmitting auxiliary electrode 242 parallel to and separated from the transmitting main electrode 240 and the auxiliary connecting electrode 244 connecting together the transmitting main electrode 240 and the transmitting auxiliary electrode 242.

The transmitting main electrode 240 of the boundary area BA has a straight bar shape extending along the vertical direction across a whole of each touch unit TU, and the transmitting main electrodes 240 of the boundary area BA of the adjacent touch units TU are connected to each other via the transmitting connecting electrode 246 in the boundary area BA. As a result, the transmitting main electrode 240 of the boundary area BA may have a straight bar shape extending and connected across a whole of the touch panel 230.

The transmitting auxiliary electrode 242 of the boundary area BA has a straight bar shape divided along the vertical direction in each touch unit TU, and the transmitting auxiliary electrodes 242 of the adjacent touch units TU may be divided from each other. For example, the transmitting auxiliary electrodes 242 of the adjacent touch units TU may be divided (e.g., separated) from each other at intersection points of the transmitting auxiliary electrodes 242 and the receiving main electrodes 250.

The auxiliary connecting electrode 244 may have a straight bar shape.

Although the first touch transmitting electrode Tx1 in the boundary area BA at a left side of the central area CA includes the transmitting main electrode 240, the transmitting auxiliary electrode 242 and the auxiliary connecting electrode 244 in FIG. 5, a pth touch transmitting electrode Txp in the boundary area BA at a right side of the central area CA may also include the transmitting main electrode 240, the transmitting auxiliary electrode 242 and the auxiliary connecting electrode 244.

A second touch transmitting electrode Tx2 in the central area CA among the plurality of touch transmitting electrodes Tx1 to Txp includes the transmitting main electrode 240 parallel to the vertical direction which is a direction of the long side of the rectangular shape without the transmitting auxiliary electrode 242 and the auxiliary connecting electrode 244.

The transmitting main electrode 240 of the central area CA has a straight bar shape extending along the vertical direction across a whole of each touch unit TU, and the transmitting main electrodes 240 of the central area CA of the adjacent touch units TU are connected to each other via the transmitting connecting electrode 246 in the centra area CA. As a result, the transmitting main electrode 240 of the central area CA may have a straight bar shape extending and connected across a whole of the touch panel 230.

Although the second touch transmitting electrode Tx2 in the central area CA includes the transmitting main electrode 240 in FIG. 5, each of third to (p−1)th touch transmitting electrodes Tx3 to Tx(p−1) in the central area CA may also include the transmitting main electrode 240.

In the touch unit TU of the boundary area BA and the central area CA, the transmitting main electrode 240 may have a number of one or more per one touch unit TU. When the transmitting main electrode 240 has a number of two or more, the two or more transmitting main electrodes 240 parallel to and separated from each other may be connected to each other through the transmitting connecting electrode 246.

The transmitting connecting electrode 246 may have a straight bar shape.

An nth touch receiving electrode Rxn one of the plurality of touch receiving electrodes Rx1 to Rxq includes a receiving main electrode 250 parallel to a horizontal direction which is a direction of a short side of the rectangular shape.

The receiving main electrode 250 has a straight bar shape extending along the horizontal direction across a whole of each touch unit TU, and the receiving main electrodes 250 of the adjacent touch units TU are connected to each other. As a result, the receiving main electrode 250 may have a straight bar shape extending and connected across a whole of the touch panel 230.

Although the nth touch receiving electrode Rxn includes the receiving main electrode 250 in FIG. 5, each of first to (n−1)th touch receiving electrodes Rx1 to Rx(n−1) and (n+1)th to qth touch receiving electrodes Rx(n+1) to Rxq may also include the receiving main electrode 250.

The receiving main electrode 250 may have a number of one or more per one touch unit TU. When the receiving main electrode 250 has a number of two or more, the two or more receiving main electrodes 250 parallel to and separated from each other may be connected to each other through the receiving connecting electrode 252.

The receiving connecting electrode 252 may have a straight bar shape.

Although not shown, the transmitting main electrode 240, the transmitting auxiliary electrode 242, the auxiliary connecting electrode 244 and the transmitting connecting electrode 246 of the touch transmitting electrode Tx and the receiving main electrode 250 and the receiving connecting electrode 252 of the touch receiving electrode Rx may be disposed to correspond to a border portion between subpixels of the display panel.

In the touch display device according to a second embodiment of the present disclosure, since the touch unit TU of the boundary area BA of the touch panel 230 is formed to have an area smaller than an area of the touch unit TU of the central area CA, a design limit of the boundary area BA with respect to the central area CA is overcome.

Further, a touch is detected from a change $\Delta Cm$ of a mutual capacitance Cm between the touch transmitting electrode Tx and the touch receiving electrode Rx according to a touch of a finger, and the touch transmitting electrode Tx of the boundary area BA includes the transmitting main electrode 240 having a straight bar shape extending and connected across a whole of the touch unit TU and the transmitting auxiliary electrode 242 having a straight bar shape divided in the touch unit TU. As a result, an area of the touch electrode corresponding to a finger substantially increases and the change $\Delta Cm$ of the mutual capacitance Cm increases, thereby a touch sensitivity improved.

In another embodiment, the transmitting main electrode and the transmitting auxiliary electrode may be formed to have a zigzag shape.

Figure 6:
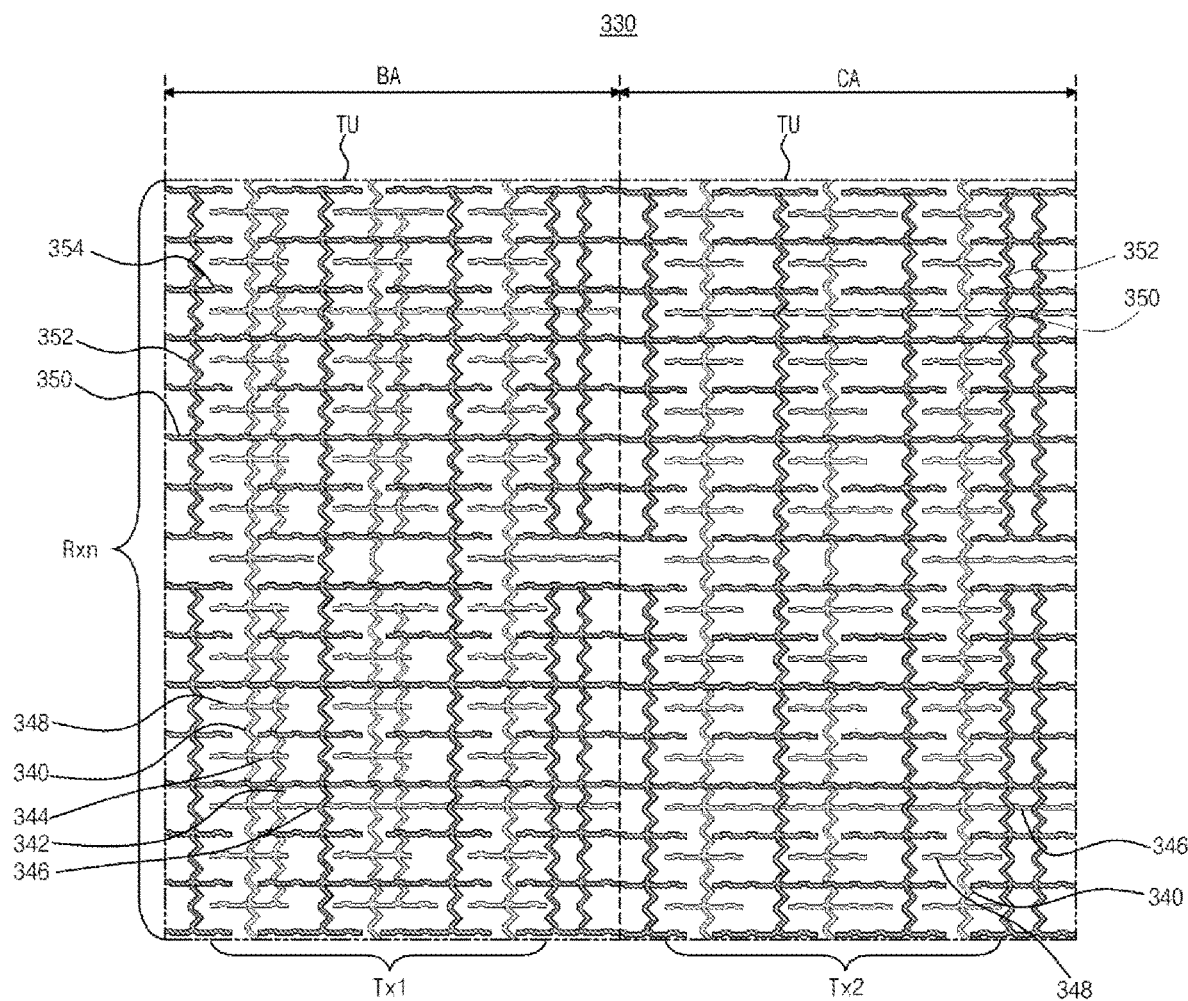
FIG. 6 is a plan view showing a touch panel of a touch display device according to a third embodiment of the present disclosure.

FIG. 6 is a plan view showing a touch panel of a touch display device according to a third embodiment of the present disclosure. Description of a part of the third embodiment that is the same as a part of the first and second embodiments will be omitted for ease of description. Although FIG. 6 illustrates a width of the touch unit TU in the boundary area BA to be similar to a width of the touch unit TU in the central area CA, the drawings are not to scale and show similar widths for ease of illustration.

In FIG. 6, a touch panel 330 of a touch display device according to a third embodiment of the present disclosure has a central area CA and a boundary area BA at both sides of the central area CA. Among a plurality of touch transmitting electrodes Tx1 to Txp, a touch transmitting electrode Tx of a touch unit TU of the boundary area BA includes a transmitting main electrode 340 and a transmitting auxiliary electrode 342, and the touch transmitting electrode Tx of the touch unit TU of the central area CA includes the transmitting main electrode 340 without the transmitting auxiliary electrode 342. As a result, a reduction of a touch sensitivity in the boundary area BA may be reduced compared with the central area CA.

For example, a first touch transmitting electrode Tx1 in the boundary area BA among the plurality of touch transmitting electrodes Tx1 to Txp includes a transmitting main electrode 340 that extends in a direction that is parallel to a vertical direction which is a direction of a long side of a rectangular shape, a transmitting auxiliary electrode 342 that extends in a direction parallel to and separated from the transmitting main electrode 340, an auxiliary connecting electrode 344 connecting the transmitting main electrode 340 and the transmitting auxiliary electrode 342 together, and a transmitting extending electrode 348 extending from the transmitting main electrode 340 and the transmitting auxiliary electrode 342.

The transmitting main electrode 340 of the boundary area BA has a zigzag bar shape extending along the vertical direction across a whole of each touch unit TU, and the transmitting main electrodes 340 of the boundary area BA of the adjacent touch units TU are connected to each other. As a result, the transmitting main electrode 340 of the boundary area BA may have a zigzag bar shape extending and connected across a whole of the touch panel 330.

The transmitting auxiliary electrode 342 of the boundary area BA has a zigzag bar shape divided (e.g., separated) along the vertical direction in each touch unit TU, and the transmitting auxiliary electrodes 342 of the adjacent touch units TU may be divided from each other.

The auxiliary connecting electrode 344 and the transmitting extending electrode 348 may have a zigzag bar shape.

Although the first touch transmitting electrode Tx1 in the boundary area BA at a left side (e.g., a first side) of the central area CA includes the transmitting main electrode 340, the transmitting auxiliary electrode 342 and the auxiliary connecting electrode 344 in FIG. 6, a pth touch transmitting electrode Txp in the boundary area BA at a right side (e.g., a second side) of the central area CA may include the transmitting main electrode 340, the transmitting auxiliary electrode 342 and the auxiliary connecting electrode 344.

A second touch transmitting electrode Tx2 in the central area CA among the plurality of touch transmitting electrodes Tx1 to Txp includes the transmitting main electrode 340 that extends in a direction parallel to the vertical direction which is a direction of the long side of the rectangular shape and the transmitting extending electrode 348 extending from the transmitting main electrode 340.

The transmitting main electrode 340 of the central area CA has a zigzag bar shape extending along the vertical direction across a whole of each touch unit TU, and the transmitting main electrodes 340 of the central area CA of the adjacent touch units TU are connected to each other. As a result, the transmitting main electrode 340 of the central area CA may have a zigzag bar shape extending and connected across a whole of the touch panel 330.

Although the second touch transmitting electrode Tx2 in the central area CA includes the transmitting main electrode 340 in FIG. 6, each of third to (p−1)th touch transmitting electrodes Tx3 to Tx(p−1) in the central area CA may include the transmitting main electrode 340.

In the touch unit TU of the boundary area BA and the central area CA, the transmitting main electrode 340 may have a number of one or more per one touch unit TU. When the transmitting main electrode 340 has a number of two or more, the two or more transmitting main electrodes 340 parallel to and separated from each other may be connected to each other through the transmitting connecting electrode 346.

The transmitting connecting electrode 346 may have a zigzag bar shape.

An nth touch receiving electrode Rxn one of the plurality of touch receiving electrodes Rx1 to Rxq includes a receiving main electrode 350 that extends in a direction parallel to a horizontal direction which is a direction of a short side of the rectangular shape and a receiving extending electrode 354 extending from the receiving main electrode 350.

The receiving main electrode 350 has a zigzag bar shape extending along the horizontal direction across a whole of each touch unit TU, and the receiving main electrodes 350 of the adjacent touch units TU are connected to each other. As a result, the receiving main electrode 350 may have a zigzag bar shape extending and connected across a whole of the touch panel 330.

Although the nth touch receiving electrode Rxn includes the receiving main electrode 350 in FIG. 6, each of first to (n−1)th touch receiving electrodes Rx1 to Rx(n−1) and (n+1)th to qth touch receiving electrodes Rx(n+1) to Rxq may include the receiving main electrode 350.

The receiving main electrode 350 may have a number of one or more per one touch unit TU. When the receiving main electrode 350 has a number of two or more, the two or more receiving main electrodes 350 parallel to and separated from each other may be connected to each other through the receiving connecting electrode 352. In this case, the receiving extending electrode 354 extends from the receiving connecting electrode 352 in parallel with the receiving main electrodes 350.

The receiving connecting electrode 352 and the receiving extending electrode 354 may have a zigzag bar shape.

Although not shown, the transmitting main electrode 340, the transmitting auxiliary electrode 342, the auxiliary connecting electrode 344, the transmitting connecting electrode 346 and the transmitting extending electrode 348 of the touch transmitting electrode Tx and the receiving main electrode 350, the receiving connecting electrode 352 and the receiving extending electrode 354 of the touch receiving electrode Rx may be disposed to correspond to a border portion between subpixels of the display panel.

In the touch display device according to a third embodiment of the present disclosure, since the touch unit TU of the boundary area BA of the touch panel 330 is formed to have an area smaller than an area of the touch unit TU of the central area CA, a design limit of the boundary area BA with respect to the central area CA is overcome.

Further, a touch is detected from a change ΔCm of a mutual capacitance Cm between the touch transmitting electrode Tx and the touch receiving electrode Rx according to a touch of a finger, and the touch transmitting electrode Tx of the boundary area BA includes the transmitting main electrode 340 having a zigzag bar shape extending and connected across a whole of the touch unit TU and the transmitting auxiliary electrode 342 having a zigzag bar shape divided in the touch unit TU. As a result, an area of the touch electrode corresponding to a finger substantially increases and the change ΔCm of the mutual capacitance Cm increases, thereby a touch sensitivity improved.

Moreover, the touch transmitting electrode Tx and the touch receiving electrode Rx are formed to have a zigzag bar shape, and the transmitting extending electrode 348 and the receiving extending electrode 354 are further formed. As a result, an area of the touch electrode corresponding to a finger further substantially increases and the change ΔCm of the mutual capacitance Cm further increases, thereby a touch sensitivity further improved.

In another embodiment, the transmitting auxiliary electrode may be formed to have a divided shape at both sides of the transmitting main electrode.

Figure 7:
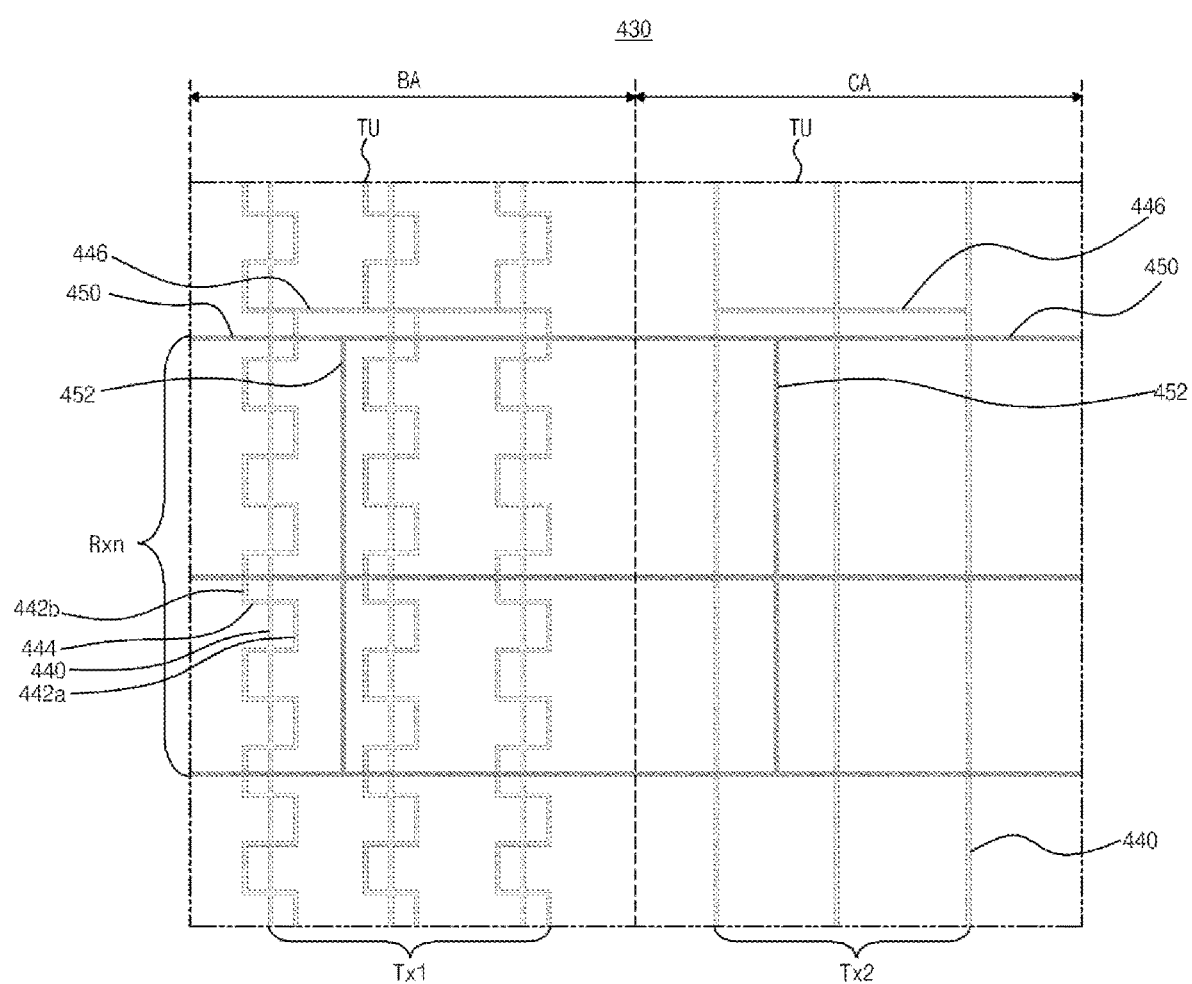
FIG. 7 is a plan view showing a touch panel of a touch display device according to a fourth embodiment of the present disclosure.
Figure 8:
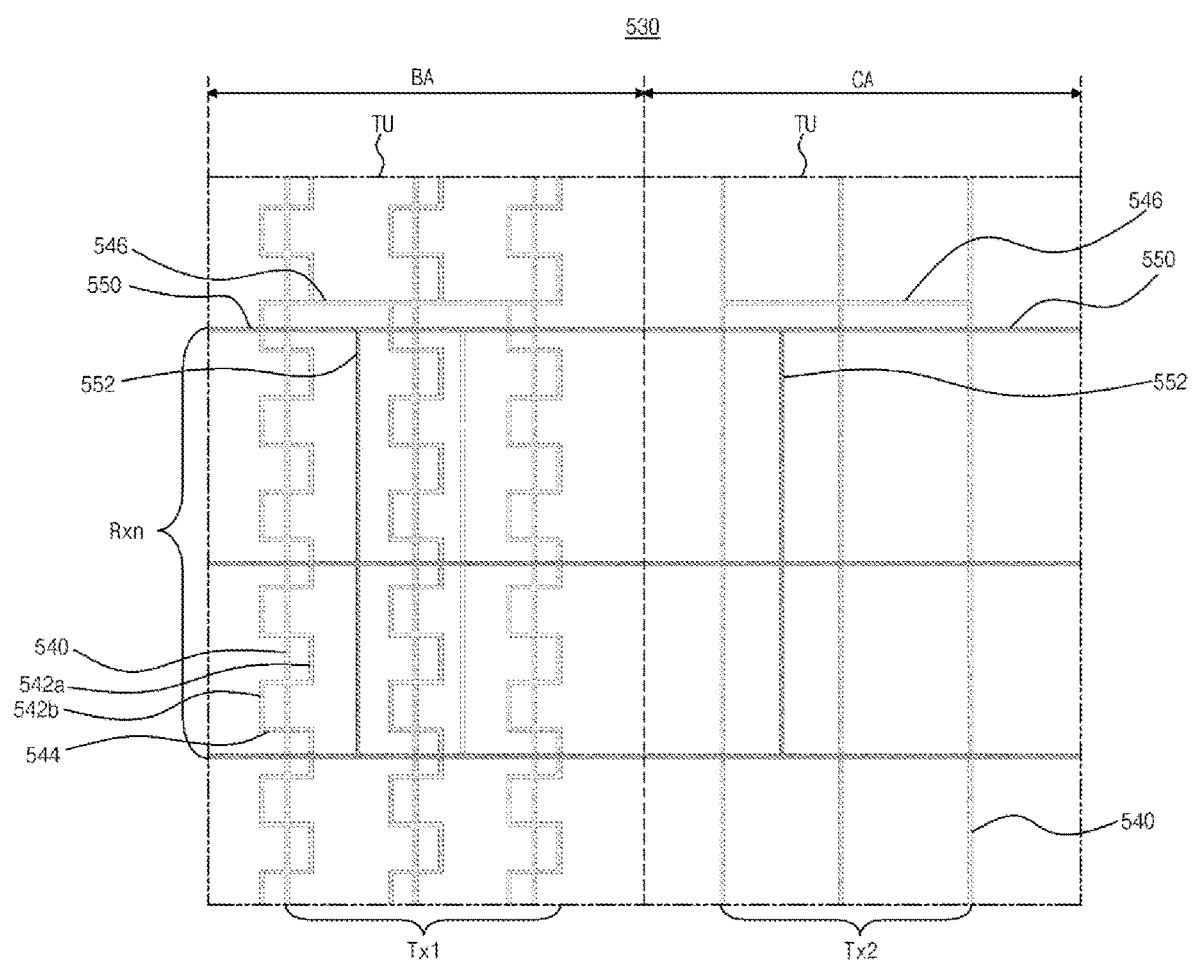
FIG. 8 is a plan view showing a touch panel of a touch display device according to a fifth embodiment of the present disclosure.

FIGS. 7 and 8 are plan views showing a touch panel of a touch display device according to fourth and fifth embodiments, respectively, of the present disclosure. Description of a part of the fourth and fifth embodiments that are the same as a part of the first to third embodiments will be omitted for ease of description. Although FIGS. 7 and 8 illustrate a width of the touch unit TU in the boundary area BA to be similar to a width of the touch unit TU in the central area CA, the drawings are not to scale and show similar widths for ease of illustration.

In FIGS. 7 and 8, a touch panel 430 or 530 of a touch display device according to fourth and fifth embodiments of the present disclosure has a central area CA and a boundary area BA at both sides of the central area CA. Among a plurality of touch transmitting electrodes Tx1 to Txp, a touch transmitting electrode Tx of a touch unit TU of the boundary area BA includes a transmitting main electrode 440 or 540, a first transmitting auxiliary electrode 442a or 542a, and a second transmitting auxiliary electrode 442b or 542b, and the touch transmitting electrode Tx of the touch unit TU of the central area CA includes the transmitting main electrode 440 or 540 without the first transmitting auxiliary electrode 442a or 542a, and the second transmitting auxiliary electrode 442b or 542b. As a result, a reduction of a touch sensitivity in the boundary area BA may be minimized as compared with the central area CA.

For example, a first touch transmitting electrode Tx1 in the boundary area BA among the plurality of touch transmitting electrodes Tx1 to Txp includes a transmitting main electrode 440 or 540 parallel to a vertical direction which is a direction of a long side of a rectangular shape, a first transmitting auxiliary electrode 442a or 542a parallel to and separated from a first side of the transmitting main electrode 440 or 540, a second transmitting auxiliary electrode 442b or 542b parallel to and separated from a second side of the transmitting main electrode 440 or 540 and an auxiliary connecting electrode 444 or 544 connecting together the first transmitting auxiliary electrode 442a or 542a and the second transmitting auxiliary electrode 442b or 542b.

The transmitting main electrode 440 or 540 of the boundary area BA has a straight bar shape extending along the vertical direction across a whole of each touch unit TU, and the transmitting main electrodes 440 or 540 of the boundary area BA of the adjacent touch units TU are connected to each other. As a result, the transmitting main electrode 440 or 540 of the boundary area BA may have a straight bar shape extending and connected across a whole of the touch panel 430 or 530.

The first transmitting auxiliary electrode 442a or 542a and the second transmitting auxiliary electrode 442b or 542b of the boundary area BA has a straight bar shape divided along the vertical direction in each touch unit TU, the first transmitting auxiliary electrodes 442a or 542a of the adjacent touch units TU may be divided from each other, and the second transmitting auxiliary electrodes 442b or 542b of the adjacent touch units TU may be divided from each other.

The first transmitting auxiliary electrode 442a or 542a and the second transmitting auxiliary electrode 442b or 542b are disposed alternately in the first and second sides of the transmitting main electrode 440 or 540 along the transmitting main electrode 440 or 540.

The second transmitting auxiliary electrode 442b crosses the transmitting main electrode 450 in the fourth embodiment of FIG. 7, and the first transmitting auxiliary electrode 542a crosses the transmitting main electrode 550 in the fifth embodiment of FIG. 8. The other structures are the same as each other in fourth and fifth embodiments.

The auxiliary connecting electrode 444 or 544 may have a straight bar shape.

Although the first touch transmitting electrode Tx1 in the boundary area BA at a left side (e.g., a first side) of the central area CA includes the transmitting main electrode 440 or 540, the first transmitting auxiliary electrode 442a or 542a, the second transmitting auxiliary electrode 442b or 542b and the auxiliary connecting electrode 444 or 544 in FIGS. 7 and 8, a pth touch transmitting electrode Txp in the boundary area BA at a right side (e.g., a second side) of the central area CA may include the transmitting main electrode 440 or 540, the first transmitting auxiliary electrode 442a or 542a, the second transmitting auxiliary electrode 442b or 542b and the auxiliary connecting electrode 444 or 544.

A second touch transmitting electrode Tx2 in the central area CA among the plurality of touch transmitting electrodes Tx1 to Txp includes the transmitting main electrode 440 or 540 parallel to the vertical direction which is a direction of the long side of the rectangular shape.

The transmitting main electrode 440 or 540 of the central area CA has a straight bar shape extending along the vertical direction across a whole of each touch unit TU, and the transmitting main electrodes 440 or 540 of the central area CA of the adjacent touch units TU are connected to each other. As a result, the transmitting main electrode 440 or 540 of the central area CA may have a straight bar shape extending and connected across a whole of the touch panel 430 or 530.

Although the second touch transmitting electrode Tx2 in the central area CA includes the transmitting main electrode 440 or 540 in FIGS. 7 and 8, each of third to (p−1)th touch transmitting electrodes Tx3 to Tx(p−1) in the central area CA may include the transmitting main electrode 440 or 540.

In the touch unit TU of the boundary area BA and the central area CA, the transmitting main electrode 440 or 540 may have a number of one or more per one touch unit TU. When the transmitting main electrode 440 or 540 has a number of two or more, the two or more transmitting main electrodes 440 or 540 parallel to and separated from each other may be connected to each other through the transmitting connecting electrode 446 or 546.

The transmitting connecting electrode 446 or 546 may have a straight bar shape.

An nth touch receiving electrode Rxn one of the plurality of touch receiving electrodes Rx1 to Rxq includes a receiving main electrode 450 or 550 parallel to a horizontal direction which is a direction of a short side of the rectangular shape.

The receiving main electrode 450 or 550 has a straight bar shape extending along the horizontal direction across a whole of each touch unit TU, and the receiving main electrodes 450 or 550 of the adjacent touch units TU are connected to each other. As a result, the receiving main electrode 450 or 550 may have a straight bar shape extending and connected across a whole of the touch panel 430 or 530.

Although the nth touch receiving electrode Rxn includes the receiving main electrode 450 or 550 in FIGS. 7 and 8, each of first to (n−1)th touch receiving electrodes Rx1 to Rx(n−1) and (n+1)th to qth touch receiving electrodes Rx(n+1) to Rxq may include the receiving main electrode 450 or 550.

The receiving main electrode 450 or 550 may have a number of one or more per one touch unit TU. When the receiving main electrode 450 or 550 has a number of two or more, the two or more receiving main electrodes 450 or 550 parallel to and separated from each other may be connected to each other through the receiving connecting electrode 452 or 552.

The receiving connecting electrode 452 or 552 may have a straight bar shape.

Although not shown, the transmitting main electrode 440 or 540, the first transmitting auxiliary electrode 442a or 542a, the second transmitting auxiliary electrode 442b or 542b, the auxiliary connecting electrode 444 or 544 and the transmitting connecting electrode 446 or 546 of the touch transmitting electrode Tx and the receiving main electrode 450 or 550 and the receiving connecting electrode 452 or 552 of the touch receiving electrode Rx may be disposed to correspond to a border portion between subpixels of the display panel.

In the touch display device according to fourth and fifth embodiments of the present disclosure, since the touch unit TU of the boundary area BA of the touch panel 430 or 530 is formed to have an area smaller than an area of the touch unit TU of the central area CA, a design limit of the boundary area BA with respect to the central area CA is overcome.

Further, a touch is detected from a change ΔCm of a mutual capacitance Cm between the touch transmitting electrode Tx and the touch receiving electrode Rx according to a touch of a finger, and the touch transmitting electrode Tx of the boundary area BA includes the transmitting main electrode 440 or 540 having a straight bar shape extending and connected across a whole of the touch unit TU, the first transmitting auxiliary electrode 442a or 542a and the second transmitting auxiliary electrode 442b or 542b having a straight bar shape divided in the touch unit TU. As a result, an area of the touch electrode corresponding to a finger substantially increases and the change ΔCm of the mutual capacitance Cm increases, thereby a touch sensitivity improved.

Moreover, the first transmitting auxiliary electrode 442a or 542a and the second transmitting auxiliary electrode 442b or 542b are disposed alternately in the first and second sides of the transmitting main electrode 440 or 540 along the transmitting main electrode 440 or 540. As a result, an area of the touch electrode corresponding to a finger further substantially increases and the change ΔCm of the mutual capacitance Cm further increases, thereby a touch sensitivity further improved.

In another embodiment, the transmitting auxiliary electrode may be formed to have a divided shape at both sides of the transmitting main electrode, and the transmitting main electrode and the transmitting auxiliary electrode may be formed to have a zigzag shape.

Figure 9:
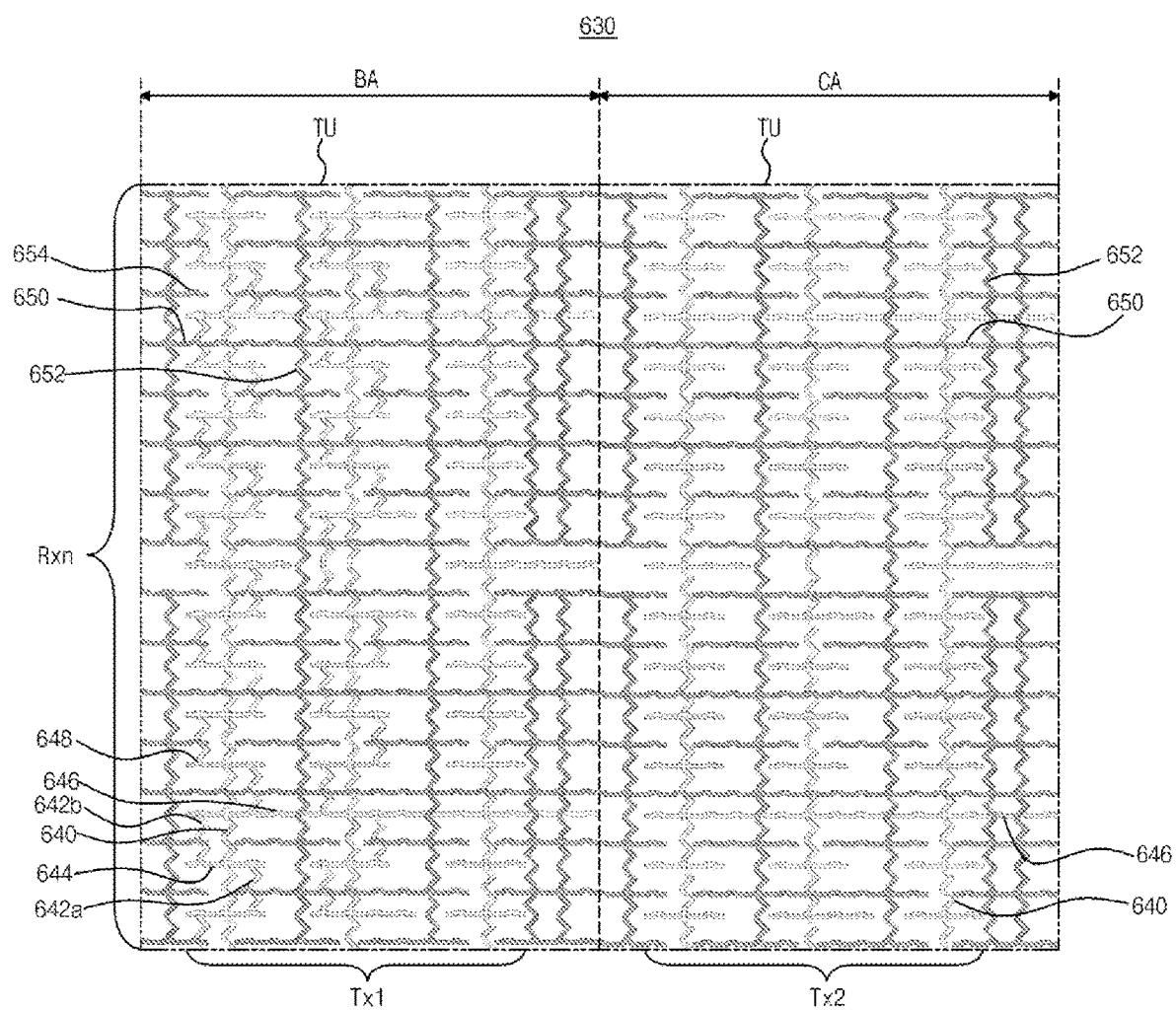
FIG. 9 is a plan view showing a touch panel of a touch display device according to a sixth embodiment of the present disclosure.

FIG. 9 is a plan view showing a touch panel of a touch display device according to a sixth embodiment of the present disclosure. Description of a part of the sixth embodiment that is the same as a part of the first to fifth embodiments will be omitted for ease of description. Although FIG. 9 illustrates a width of the touch unit TU in the boundary area BA to be similar to a width of the touch unit TU in the central area CA, the drawings are not to scale and show similar widths for ease of illustration.

In FIG. 9, a touch panel 630 of a touch display device according to a sixth embodiment of the present disclosure has a central area CA and a boundary area BA at both sides of the central area CA. Among a plurality of touch transmitting electrodes Tx1 to Txp, a touch transmitting electrode Tx of a touch unit TU of the boundary area BA includes a transmitting main electrode 640 and first and second transmitting auxiliary electrodes 642a and 642b, and the touch transmitting electrode Tx of the touch unit TU of the central area CA includes the transmitting main electrode 640 without the first and second transmitting auxiliary electrodes 642a and 642b. As a result, a reduction of a touch sensitivity in the boundary area BA may be minimized as compared with the central area CA.

For example, a first touch transmitting electrode Tx1 in the boundary area BA among the plurality of touch transmitting electrodes Tx1 to Txp includes a transmitting main electrode 640 parallel to a vertical direction which is a direction of a long side of a rectangular shape, first and second transmitting auxiliary electrodes 642a and 642b parallel to and separated from first and second sides of the transmitting main electrode 640, an auxiliary connecting electrode 644 connecting the transmitting main electrode 640 and the first and second transmitting auxiliary electrodes 642a and 642b and a transmitting extending electrode 648 extending from the transmitting main electrode 640 and the first and second transmitting auxiliary electrodes 642a and 642b.

The transmitting main electrode 640 of the boundary area BA has a zigzag bar shape extending along the vertical direction across a whole of each touch unit TU, and the transmitting main electrodes 640 of the boundary area BA of the adjacent touch units TU are connected to each other. As a result, the transmitting main electrode 640 of the boundary area BA may have a zigzag bar shape extending and connected across a whole of the touch panel 630.

The first and second transmitting auxiliary electrodes 642a and 642b of the boundary area BA have a zigzag bar shape divided along the vertical direction in each touch unit TU, the first transmitting auxiliary electrodes 642a of the adjacent touch units TU may be divided from each other, and the second transmitting auxiliary electrodes 642b of the adjacent touch units TU may be divided from each other.

The auxiliary connecting electrode 644 and the transmitting extending electrode 648 may have a zigzag bar shape.

Although the first touch transmitting electrode Tx1 in the boundary area BA at a left side of the central area CA includes the transmitting main electrode 640, the first and second transmitting auxiliary electrodes 642a and 642b and the auxiliary connecting electrode 644 in FIG. 9, a pth touch transmitting electrode Txp in the boundary area BA at a right side of the central area CA may include the transmitting main electrode 640, the first and second transmitting auxiliary electrodes 642a and 642b and the auxiliary connecting electrode 644.

A second touch transmitting electrode Tx2 in the central area CA among the plurality of touch transmitting electrodes Tx1 to Txp includes the transmitting main electrode 640 parallel to the vertical direction which is a direction of the long side of the rectangular shape and the transmitting extending electrode 648 extending from the transmitting main electrode 640.

The transmitting main electrode 640 of the central area CA has a zigzag bar shape extending along the vertical direction across a whole of each touch unit TU, and the transmitting main electrodes 640 of the central area CA of the adjacent touch units TU are connected to each other. As a result, the transmitting main electrode 640 of the central area CA may have a zigzag bar shape extending and connected across a whole of the touch panel 630.

Although the second touch transmitting electrode Tx2 in the central area CA includes the transmitting main electrode 640 in FIG. 9, each of third to (p−1)th touch transmitting electrodes Tx3 to Tx(p−1) in the central area CA may include the transmitting main electrode 640.

In the touch unit TU of the boundary area BA and the central area CA, the transmitting main electrode 640 may have a number of one or more per one touch unit TU. When the transmitting main electrode 640 has a number of two or more, the two or more transmitting main electrodes 640 parallel to and separated from each other may be connected to each other through the transmitting connecting electrode 646.

The transmitting connecting electrode 646 may have a zigzag bar shape.

An nth touch receiving electrode Rxn one of the plurality of touch receiving electrodes Rx1 to Rxq includes a receiving main electrode 650 parallel to a horizontal direction which is a direction of a short side of the rectangular shape and a receiving extending electrode 654 extending from the receiving main electrode 650.

The receiving main electrode 650 has a zigzag bar shape extending along the horizontal direction across a whole of each touch unit TU, and the receiving main electrodes 650 of the adjacent touch units TU are connected to each other. As a result, the receiving main electrode 650 may have a zigzag bar shape extending and connected across a whole of the touch panel 630.

Although the nth touch receiving electrode Rxn includes the receiving main electrode 650 in FIG. 9, each of first to (n−1)th touch receiving electrodes Rx1 to Rx(n−1) and (n+1)th to qth touch receiving electrodes Rx(n+1) to Rxq may include the receiving main electrode 650.

The receiving main electrode 650 may have a number of one or more per one touch unit TU. When the receiving main electrode 650 has a number of two or more, the two or more receiving main electrodes 650 parallel to and separated from each other may be connected to each other through the receiving connecting electrode 652.

The receiving connecting electrode 652 and the receiving extending electrode 654 may have a bar shape or a zigzag bar shape.

Although not shown, the transmitting main electrode 640, the first and second transmitting auxiliary electrodes 642a and 642b, the auxiliary connecting electrode 644, the transmitting connecting electrode 646 and the transmitting extending electrode 648 of the touch transmitting electrode Tx and the receiving main electrode 650, the receiving connecting electrode 652 and the receiving extending electrode 654 of the touch receiving electrode Rx may be disposed to correspond to a border portion between subpixels of the display panel.

In the touch display device according to a sixth embodiment of the present disclosure, since the touch unit TU of the boundary area BA of the touch panel 330 is formed to have an area smaller than an area of the touch unit TU of the central area CA, a design limit of the boundary area BA with respect to the central area CA is overcome.

Further, a touch is detected from a change ΔCm of a mutual capacitance Cm between the touch transmitting electrode Tx and the touch receiving electrode Rx according to a touch of a finger, and the touch transmitting electrode Tx of the boundary area BA includes the transmitting main electrode 640 having a zigzag bar shape extending and connected across a whole of the touch unit TU and the transmitting auxiliary electrode 642a and 642b having a zigzag bar shape divided in the touch unit TU. As a result, an area of the touch electrode corresponding to a finger substantially increases and the change ΔCm of the mutual capacitance Cm increases, thereby a touch sensitivity improved.

Moreover, the touch transmitting electrode Tx and the touch receiving electrode Rx are formed to have a zigzag bar shape, the transmitting extending electrode 648 and the receiving extending electrode 654 are further formed, and the first and second transmitting auxiliary electrodes 642a and 642b are disposed alternately in the first and second sides of the transmitting main electrode 640 along the transmitting main electrode 640. As a result, an area of the touch electrode corresponding to a finger further substantially increases and the change ΔCm of the mutual capacitance Cm further increases, thereby a touch sensitivity further improved.

In the first to sixth embodiments, one of the plurality of touch transmitting electrodes in the boundary area includes the at least one transmitting main electrode, the at least one transmitting auxiliary electrode and the at least one auxiliary connecting electrode, and one of the plurality of touch transmitting electrodes in the central area includes the at least one transmitting main electrode. In another embodiment, one of the plurality of touch receiving electrodes in the boundary area includes the at least one receiving main electrode, the at least one receiving auxiliary electrode and the at least one auxiliary connecting electrode, and one of the plurality of touch receiving electrodes in the central area includes the at least one receiving main electrode.

Hereinafter, the change of the mutual capacitance of the touch display device will be illustrated.

FIG. 10 is a table showing a mutual capacitance, a change of a mutual capacitance, a touch sensitivity and a parasitic capacitance of a touch display device according to third and sixth embodiments of the present disclosure.

In FIG. 10, a touch transmitting electrode of a boundary area of a touch panel of a comparison example includes a transmitting main electrode of a zigzag bar shape. The touch transmitting electrode Tx of the boundary area BA of the touch panel 330 according to a third embodiment of the present disclosure includes the transmitting main electrode 340 of the zigzag bar shape and the transmitting auxiliary electrode 342 of the zigzag bar shape, and the touch transmitting electrode Tx of the boundary area BA of the touch panel 630 according to a sixth embodiment of the present disclosure includes the transmitting main electrode 640 of the zigzag bar shape and the first and second transmitting auxiliary electrodes 642a and 642b of the zigzag bar shape. As compared with the comparison example, the change ΔCm of the mutual capacitance Cm increases, the touch sensitivity is improved, and a pen capacitance Cpen relating to a pen touch sensing increases in the third and sixth embodiments.

For example, the touch display device of the comparison example has a mutual capacitance Cm of about 0.2302 pF, a mutual capacitance change ΔCm of about 0.02629 pF, a touch sensitivity of about 11.42%, a pen capacitance Cpen of the touch receiving electrode Rx of about 3.54 fF and a pen capacitance Cpen of the touch transmitting electrode Tx of about 2.21 fF. The touch display device of the third embodiment has a mutual capacitance Cm of about 0.30106 pF, a mutual capacitance change ΔCm of about 0.03257 pF, a touch sensitivity of about 10.82%, a pen capacitance Cpen of the touch receiving electrode Rx of about 3.47 fF and a pen capacitance Cpen of the touch transmitting electrode Tx of about 2.63 fF. The touch display device of the sixth embodiment has a mutual capacitance Cm of about 0.31011 pF, a mutual capacitance change ΔCm of about 0.03716 pF, a touch sensitivity of about 11.98%, a pen capacitance Cpen of the touch receiving electrode Rx of about 3.47 fF and a pen capacitance Cpen of the touch transmitting electrode Tx of about 2.62 fF.

As compared with the mutual capacitance change ΔCm of the touch display device of the comparison example, the mutual capacitance change ΔCm of the touch display device of the third and sixth embodiments increase by about 23.89% and about 41.35%, respectively, and an accuracy of touch sensing is improved.

As compared with the touch sensitivity of the touch display device of the comparison example, while the touch sensitivity of the touch display device of the sixth embodiment increases by about 0.56%, the touch sensitivity of the touch display device of the third embodiment decreases by about 0.6%. However, when the touch sensitivity is equal to or greater than about 10%, the accuracy of the touch sensitivity is not influenced. As a result, the touch display device of the third embodiment has a sufficient touch sensitivity.

As compared with the pen capacitance Cpen of the touch receiving electrode Rx of the touch display device of the comparison example, the pen capacitance Cpen of the touch receiving electrode Rx of the touch display device of the third and sixth embodiments decreases by about 1.98%. However, since decrease amount is very small, the accuracy of the pen touch sensing is not influenced. As compared with the pen capacitance Cpen of the touch transmitting electrode Tx of the touch display device of the comparison example, the pen capacitance Cpen of the touch transmitting electrode Tx of the touch display device of the third and sixth embodiments increases by about 19.00% and about 18.55%, respectively, and an accuracy of the pen touch sensing is improved.

Consequently, in the touch display device according to the present disclosure, since the touch transmitting electrode of the touch unit of the boundary area having a relatively small area includes the transmitting main electrode and the transmitting auxiliary electrode parallel to each other, the design limit of the boundary area is overcome, the mutual capacitance change increases, and the touch sensitivity is improved.

In addition, since the touch transmitting electrode of the touch unit of the boundary area having a relatively small area includes the transmitting main electrode and the transmitting auxiliary electrodes alternately at both sides of the transmitting main electrode, the design limit of the boundary area is overcome, the mutual capacitance change further increases, and the touch sensitivity is further improved.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A touch panel, comprising:
a substrate including a central area and a boundary area;
a barrier layer over the substrate;
a plurality of touch transmitting electrodes on the barrier layer; and
a plurality of touch receiving electrodes that cross the plurality of touch transmitting electrodes to define a plurality of touch units,
wherein one of the plurality of touch transmitting electrodes in the boundary area includes at least one transmitting main electrode, at least one transmitting auxiliary electrode that is parallel to and horizontally separated from the at least one transmitting main electrode, and at least one auxiliary connecting electrode that connects together the at least one transmitting main electrode and the at least one transmitting auxiliary electrode,
wherein the at least one transmitting main electrode, the at least one transmitting auxiliary electrode and the at least one auxiliary connecting electrode have a same layer as each other on the barrier layer, and
wherein one of the plurality of touch transmitting electrodes in the central area includes at least one transmitting main electrode but not any transmitting auxiliary electrode and auxiliary connecting electrode.

2. The touch panel of claim 1, wherein the at least one transmitting main electrode in the boundary area or the central area includes a plurality of transmitting main electrodes that are connected together via a transmitting connecting electrode.

3. The touch panel of claim 1, wherein each of the plurality of touch receiving electrodes includes at least one receiving main electrode.

4. The touch panel of claim 3, wherein the at least one receiving main electrode includes a plurality of receiving main electrodes that are connected together via a receiving connecting electrode.

5. The touch panel of claim 3, further comprising:
a transmitting extending electrode that extends from at least one of the at least one transmitting main electrode or the at least one transmitting auxiliary electrode that are in the boundary area; and
a receiving extending electrode extending from the at least one receiving main electrode in the boundary area.

6. The touch panel of claim 5, wherein the at least one receiving main electrode included in the boundary area or the central area includes a plurality of receiving main electrodes that are connected together via a receiving connecting electrode, and
wherein the receiving extending electrode extends from the receiving connecting electrode.

7. The touch panel of claim 6, wherein each of the at least one transmitting main electrode, the at least one transmitting auxiliary electrode, and the at least one auxiliary connecting electrode in the boundary area has a straight bar shape or a zigzag bar shape.

8. The touch panel of claim 6, wherein the at least one transmitting auxiliary electrode includes a first transmitting auxiliary electrode at a first side of the at least one transmitting main electrode and a second transmitting auxiliary electrode at a second side of the at least one transmitting main electrode that is opposite the first side.

9. The touch panel of claim 8, wherein the first transmitting auxiliary electrodes of adjacent touch units are separated from each other, and the second transmitting auxiliary electrodes of adjacent touch units are separated from each other, and
wherein the first auxiliary electrodes and the second transmitting auxiliary electrodes alternate in the first side and the second side along the at least one transmitting main electrode.

10. The touch panel of claim 1, wherein the at least one transmitting auxiliary electrode is divided into a plurality of auxiliary electrode portions in at least one of the plurality of touch units.

11. The touch panel of claim 1, wherein a first width of one of the plurality of touch units in the central area is greater than a second width of one of the plurality of touch units in the boundary area.

12. The touch panel of claim 1, further comprising:
a first insulating layer of an organic insulating material between the substrate and the barrier layer of an inorganic insulating material;
a second insulating layer of an organic insulating material between the plurality of touch transmitting electrodes and the plurality of touch receiving electrodes; and
a passivation layer of an inorganic insulating material on the plurality of touch receiving electrodes.

13. A touch display device, comprising:
a display panel configured to display an image;
a touch panel on the display panel, the touch panel comprising:
a substrate including a central area and a boundary area;
a barrier layer over the substrate;
a plurality of touch transmitting electrodes on the barrier layer; and
a plurality of touch receiving electrodes that cross the plurality of touch transmitting electrodes to define a plurality of touch units,
wherein one of the plurality of touch transmitting electrodes in the boundary area includes at least one transmitting main electrode, at least one transmitting auxiliary electrode that is parallel to and horizontally separated from the at least one transmitting main electrode, and at least one auxiliary connecting electrode that connects together the at least one transmitting main electrode and the at least one transmitting auxiliary electrode,
wherein the at least one transmitting main electrode, the at least one transmitting auxiliary electrode and the at least one auxiliary connecting electrode have a same layer as each other on the barrier layer, and
wherein one of the plurality of touch transmitting electrodes in the central area includes at least one transmitting main electrode but not any auxiliary electrode and auxiliary connecting electrode; and
a cover window on the touch panel.

14. The touch display device of claim 13, wherein the at least one transmitting main electrode, the at least one transmitting auxiliary electrode, and the at least one auxiliary connecting electrode of the plurality of touch transmitting electrodes in the boundary area as well as the plurality of touch receiving electrodes are at a border portion between subpixels of the display panel.

15. A touch panel comprising:
a substrate including a central area and a boundary area that is at least partially around the central area;
a barrier layer over the substrate;
a plurality of first touch electrodes across the central area and the boundary area, the plurality of first touch electrodes configured to transmit a touch receiving signal indicative of touch of the touch panel;
a first touch unit on the barrier layer in the central area, the first touch unit having a first area and including one or more second touch electrodes that cross the plurality of first touch electrodes in the central area, the one or more second touch electrodes configured to receive a touch transmitting signal for sensing the touch; and
a second touch unit on the barrier layer in the boundary area, the second touch unit having a second area that is less than the first area and including one or more second touch electrodes that cross the plurality of first touch electrodes in the boundary area, the one or more second touch electrodes configured receive the touch transmitting signal for sensing the touch,
wherein a total number of the one or more second touch electrodes in the second touch unit in the boundary area is greater than a total number of the one or more second touch electrodes in the first touch unit in the central area,
wherein the one or more second touch electrodes in the boundary area includes a plurality of second touch electrodes parallel to and horizontally separated from each other,
wherein the plurality of second touch electrodes in the boundary area have a same layer as each other on the barrier layer.

16. The touch panel of claim 15, wherein the one or more second touch electrodes included in the second touch unit in the boundary area includes:
- at least one transmitting main electrode that receives the touch transmitting signal;
- at least one transmitting auxiliary electrode that is parallel to and separated from the at least one transmitting main electrode; and
- at least one auxiliary connecting electrode that connects together the at least one transmitting main electrode and the at least one transmitting auxiliary electrode.

17. The touch panel of claim 16, wherein the at least one transmitting main electrode included in the second touch unit in the boundary area includes a plurality of transmitting main electrodes, the touch panel further comprising:
- a transmitting connecting electrode that connects together the plurality of transmitting main electrodes.

18. The touch panel of claim 16, wherein the one or more second touch electrodes included in the first touch unit in the central area includes:
- at least one transmitting main electrode that receives the touch transmitting signal but not any transmitting auxiliary electrode and auxiliary connecting electrode.

19. The touch panel of claim 16, further comprising:
- a receiving connecting electrode that connects together at least some of the plurality of first touch electrodes.

20. The touch panel of claim 16, wherein each of the at least one transmitting main electrode, the at least one transmitting auxiliary electrode, and the at least one auxiliary connecting electrode in the boundary area has a straight bar shape or a zigzag bar shape.

21. The touch panel of claim 15, wherein a first width of the first touch unit in the central area is greater than a second width of the second touch unit in the boundary area.

* * * * *